United States Patent
Mettler et al.

(10) Patent No.: US 10,196,953 B2
(45) Date of Patent: Feb. 5, 2019

(54) TANK COVER FOR DIESEL EXHAUST FLUID TANK

(71) Applicant: Lund, Inc., Buford, GA (US)

(72) Inventors: Dean Mettler, Sturgis, MI (US); Brian Cutway, Addison, NY (US)

(73) Assignee: Lund, Inc., Buford, GA (US)

( * ) Notice: Subject to any disclaimer, the term of this patent is extended or adjusted under 35 U.S.C. 154(b) by 74 days.

(21) Appl. No.: 15/469,308

(22) Filed: Mar. 24, 2017

(65) Prior Publication Data

US 2017/0306822 A1 Oct. 26, 2017

Related U.S. Application Data

(60) Provisional application No. 62/326,191, filed on Apr. 22, 2016, provisional application No. 62/456,441, filed on Feb. 8, 2017.

(51) Int. Cl.
*F01N 3/00* (2006.01)
*F01N 3/20* (2006.01)

(52) U.S. Cl.
CPC ........ *F01N 3/2066* (2013.01); *F01N 2340/04* (2013.01); *F01N 2450/40* (2013.01); *F01N 2610/02* (2013.01); *F01N 2610/1406* (2013.01); *Y02A 50/2322* (2018.01); *Y02T 10/24* (2013.01)

(58) Field of Classification Search
USPC .......... 60/272, 274, 282, 286, 295, 301, 303
See application file for complete search history.

(56) References Cited

U.S. PATENT DOCUMENTS

| | | | | |
|---|---|---|---|---|
| 8,708,087 B2* | 4/2014 | Kashu | ..................... | B60K 13/04 180/291 |
| 2012/0061995 A1* | 3/2012 | Maeba | ................... | E02F 9/0833 296/193.06 |
| 2013/0292386 A1* | 11/2013 | Klauer | ................... | B60K 13/04 220/553 |
| 2013/0341481 A1* | 12/2013 | Sasaki | .................. | B60K 15/067 248/503 |
| 2016/0089974 A1* | 3/2016 | Tanigawa | .............. | B60K 15/063 280/834 |
| 2016/0160469 A1* | 6/2016 | Panneer | ................ | F01N 3/2066 180/69.2 |

OTHER PUBLICATIONS

Printout of Truck Trend webpage http://www.trucktrend.com/how-to/parts-accessories/1506-tanda-performance-skidplate-fo, dated Feb. 12, 2016.
Skyjacker Suspensions Installation Instructions for 2011-12 Chevy / GM 2500HD DEF/ Urea Tank Skid Plate, available at least in 2011-2012.

(Continued)

*Primary Examiner* — Binh Q Tran
(74) *Attorney, Agent, or Firm* — Knobbe, Martens, Olson & Bear, LLP (57) ABSTRACT

Embodiments of a tank cover for covering a diesel exhaust fluid tank of a vehicle. The tank cover can be added directly over a diesel exhaust fluid tank or can be used to replace a factory/OEM or other replacement cover. In some embodiments, the tank cover can be easily installed onto a vehicle through existing components, and no additional drilling may need to be performed.

11 Claims, 10 Drawing Sheets

(56) References Cited

OTHER PUBLICATIONS

Or-Fab GM Pickup 2500HD / 2500HD Diesel UREA / Def Tank Skid Plate Instructions, available at least at Feb. 18, 2016.
Fabtech Installation Instructions 2011-13 GM K2500HD 4WD Def Skid Plate, available in 2011-2013.
Printout of CST Performance Suspension Def Tank Skid-Plate | 2011-2016 2500HD | Black (No Logo) webpage http://cstsuspension.com/2011-2016-hd-2500-3500/284-def-tank-skid-plate-2011-2016-25, dated Feb. 12, 2016.
CST Performance Suspension Def Tank Skid-Plate, available at least at Feb. 12, 2016.
Hitch Direct Urea Tank Guard DEF Tank Guard for Ram Reg Cab, on sale at least at Oct. 25, 2013.

* cited by examiner

TANK COVER FOR DIESEL EXHAUST FLUID TANK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure generally relates to tank covers for covering a diesel exhaust fluid (DEF) tank.

Description of the Related Art

To ensure full combustion of soot, and to prevent the exhaust of unburnt fuel, diesel engines can be run with a lean burn air-to-fuel ratio, meaning that an excess of air can be used in an internal combustion engine. However, as a consequence the excess air can lead to the generation of mono-nitrogen oxides ($NO_x$) which can be harmful to the environment, such as through the generation of acid rain. Accordingly, many diesel engines are equipped with diesel exhaust fluid which can minimize or eliminate harmful emissions such as $NO_x$.

Diesel exhaust fluid is typically formed from an aqueous urea solution made by mixing together urea and deionized water. The mixture is generally formed in a 1:3 ratio. The diesel exhaust fluid can be used as a consumable in a selective catalytic reaction in order to reduce certain harmful emissions, such as $NO_x$.

Typically, diesel exhaust fluid is stored in a tank separate from the diesel fuel and injected into the exhaust pipeline of the vehicle. The diesel exhaust fluid vaporizes and decomposes to form ammonia and carbon dioxide, and the ammonia can react to NOx to form harmless water and nitrogen. As the tank can be exposed to the environment outside of the vehicle itself, many diesel exhaust fluid tanks have a cover to prevent damage and general wear and tear to the tank. Many of these tanks are installed by the car manufacturers themselves.

Figure 1:
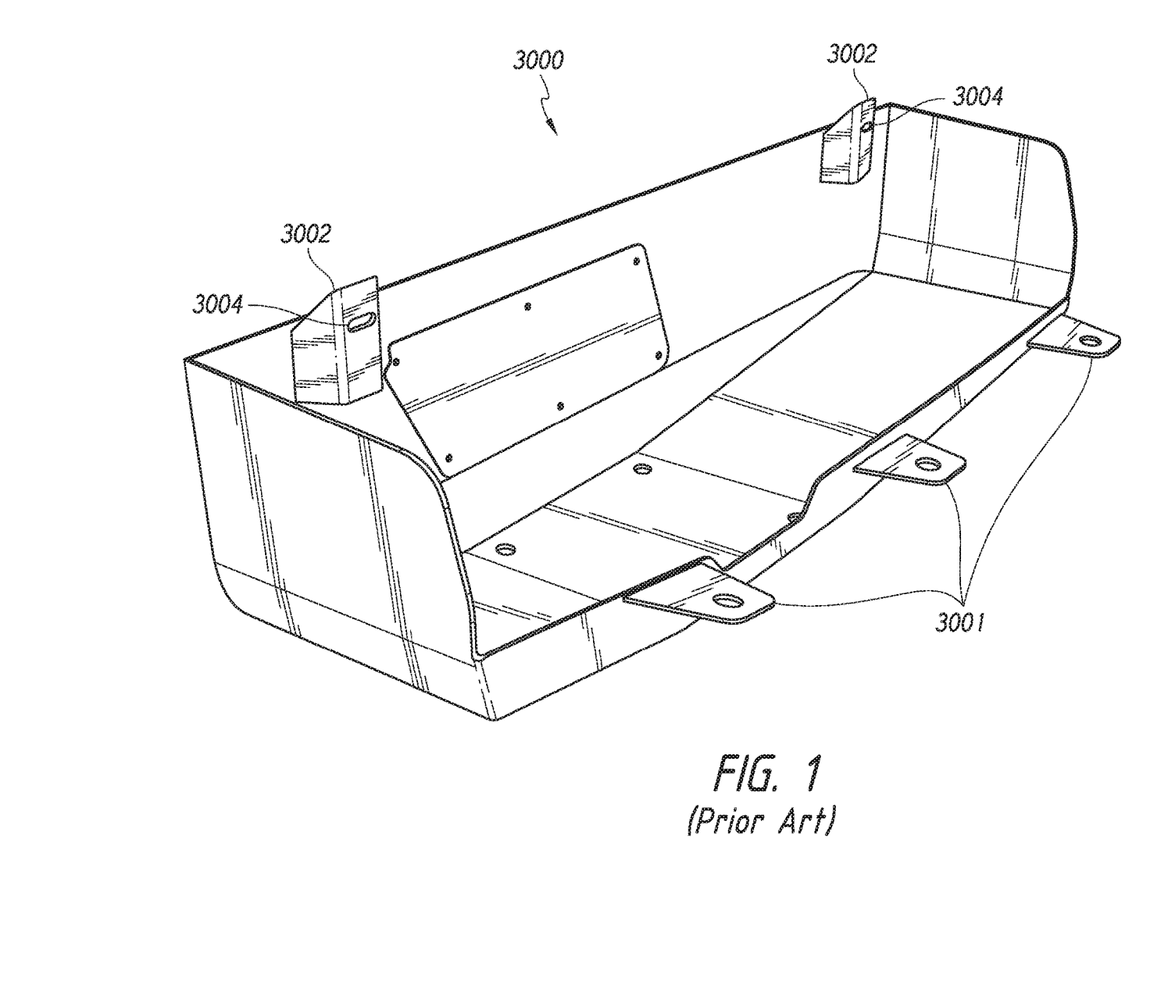
FIG. 1 illustrates a DEF tank cover of the prior art.

FIG. 1 illustrates a DEF tank cover 3000 known in the art, typically used as a replacement cover to replace a factory cover. The cover 3000 can be attached to a vehicle at an inboard and outboard side. For the inboard side, inboard mounting tabs 3001 can be used. For the outboard side, a pair of extension members 3002 extend inboard from a back wall of the cover 3000. In order to install this cover 3000, a user would need to drill into the frame of vehicle at the apertures 3004 in the extension members 3002 to apply a bolt or screw to connect the cover 3000 to the vehicle frame. However, this can lead to significant problems for a user such as drilling in the wrong location or accidently damaging portions of the frame through the drilling. Further, the additional step of drilling into the frame requires more tools.

SUMMARY

Disclosed herein are embodiments of a cover for a diesel exhaust fluid (DEF) tank of a vehicle, the cover comprising a housing configured to at least partially surround a DEF tank, the housing having a height, width, and length, a plurality of inboard attachment tabs, the plurality of inboard attachment tabs extending away from the housing and each having an inboard aperture configured to receive a bolt from a factory DEF tank cover, a pair of vertical brackets extending away from the housing, the pair of vertical brackets extending in a generally perpendicular direction to the plurality of inboard attachment tabs, wherein each of the pair of vertical brackets comprises an outboard aperture, and a pair of outboard bolts configured to pass through the outboard apertures and into threaded holes used by the factory DEF tank cover.

In some embodiments, the cover can comprise three inboard attachment tabs. In some embodiments, the cover can be installed on a vehicle without drilling. In some embodiments, the pair of vertical brackets can comprise an aperture extending generally in the direction of the plurality of inboard attachment tabs. In some embodiments, the pair of vertical brackets can extend away from the cover at a distance of greater than half the height of the housing.

Also disclosed is a vehicle comprising embodiments of the cover described herein.

Further disclosed are embodiments of a method of installing a replacement diesel exhaust fluid (DEF) tank cover on a vehicle, the method comprising removing a previously installed DEF tank cover, removing comprising removing at least one inboard bolt from inboard mounting holes on the vehicle, removing at least one outboard bolt from outboard mounting holes on the vehicle, and removing the previously installed DEF tank cover, and installing the replacement DEF tank cover, installing comprising positioning the replacement DEF tank cover over the inboard mounting holes and the outboard mounting holes, installing at least one replacement outboard bolt through an outboard mounting aperture of the replacement DEF tank cover and into the outboard mounting holes, and installing the at least one inboard bolt through an inboard mounting aperture of the replacement DEF tank cover and into the inboard mounting hole.

In some embodiments, drilling is not used. In some embodiments, the replacement DEF tank cover can comprise an 11 gauge steel plate.

In some embodiments, the replacement DEF tank cover can comprise a housing configured to at least partially surround a DEF tank, the housing having a height, width, and length, a plurality of inboard attachment tabs, the plurality of inboard attachment tabs extending away from the housing and each having an inboard aperture configured to receive a bolt from a factory DEF tank cover, a pair of vertical brackets extending away from the housing, the pair of vertical brackets extending in a generally perpendicular direction to the plurality of inboard attachment tabs, wherein each of the pair of vertical brackets comprises an outboard aperture, and a pair of outboard bolts configured to pass through the outboard apertures and into threaded holes used by the factory DEF tank cover.

Also disclosed herein are embodiments of a method of installing a diesel exhaust fluid (DEF) tank cover on a vehicle, the method comprising removing at least one inboard bolt from an inboard mounting hole on the vehicle, removing at least one outboard bolt from an outboard mounting hole on the vehicle, positioning the DEF tank cover over the inboard mounting hole and the outboard mounting hole, installing at least one replacement outboard bolt through an outboard mounting aperture of the replacement DEF tank cover and into the outboard mounting hole, and installing the at least one inboard bolt through an inboard mounting aperture of the replacement DEF tank cover and into the inboard mounting hole.

In some embodiments, drilling is not used. In some embodiments, the DEF tank cover can comprise a housing configured to at least partially surround a DEF tank, the housing having a height, width, and length, a plurality of inboard attachment tabs, the plurality of inboard attachment tabs extending away from the housing and each having an inboard aperture configured to receive a bolt from a factory DEF tank cover, a pair of vertical brackets extending away from the housing, the pair of vertical brackets extending in a generally perpendicular direction to the plurality of inboard attachment tabs, wherein each of the pair of vertical brackets comprises an outboard aperture, and a pair of outboard bolts configured to pass through the outboard apertures and into threaded holes used by the factory DEF tank cover.

Also disclosed herein are embodiments of a vehicle having a cover assembly for a diesel exhaust fluid (DEF) tank, the vehicle comprising a DEF tank located generally under a frame of the vehicle, and a DEF tank cover assembly comprising a housing configured to at least partially surround a DEF tank, the housing having a height, width, and length, a plurality of inboard attachment tabs, the plurality of inboard attachment tabs extending away from the housing and each having an inboard aperture configured to receive a bolt from a factory DEF tank cover, a pair of vertical brackets extending away from the housing, the pair of vertical brackets extending in a generally perpendicular direction to the plurality of inboard attachment tabs, wherein each of the pair of vertical brackets comprises an outboard aperture, and a pair of outboard bolts configured to pass through the outboard apertures and into threaded holes used by the factory DEF tank cover.

DETAILED DESCRIPTION

Disclosed herein are embodiments of a cover (e.g., housing, container, covering) that can be used to cover/surround a diesel exhaust fluid (DEF) tank, preventing it from wear or damage, such as when off-roading with a vehicle or during typical operation of the vehicle. In some embodiments, the cover can be used to replace a factory or original equipment manufacturer (OEM) cover. In some embodiments, there may not be an OEM or factory installed cover, and thus embodiments of the disclosed cover can be placed directly over the DEF tank before the use of any other cover. In some embodiments, the DEF tank cover may be compatible with existing factory insulators.

Advantageously, embodiments of the disclosed cover can desirably be installed onto a vehicle over a DEF tank using components already installed into the vehicle. Thus, an installer will not need to make any additional drilling of holes/apertures or structural changes such as discussed above with respect to FIG. 1, thereby reducing the potential to damage the vehicle. Accordingly, embodiments of the DEF tank cover can be installed without additional holes/apertures/structural changes to the vehicle. Further, embodiments of the disclosed DEF tank cover can be installed easily and quickly onto the vehicle as compared to previously used DEF tank covers.

DEF Tank Cover Structure

Figure 2:
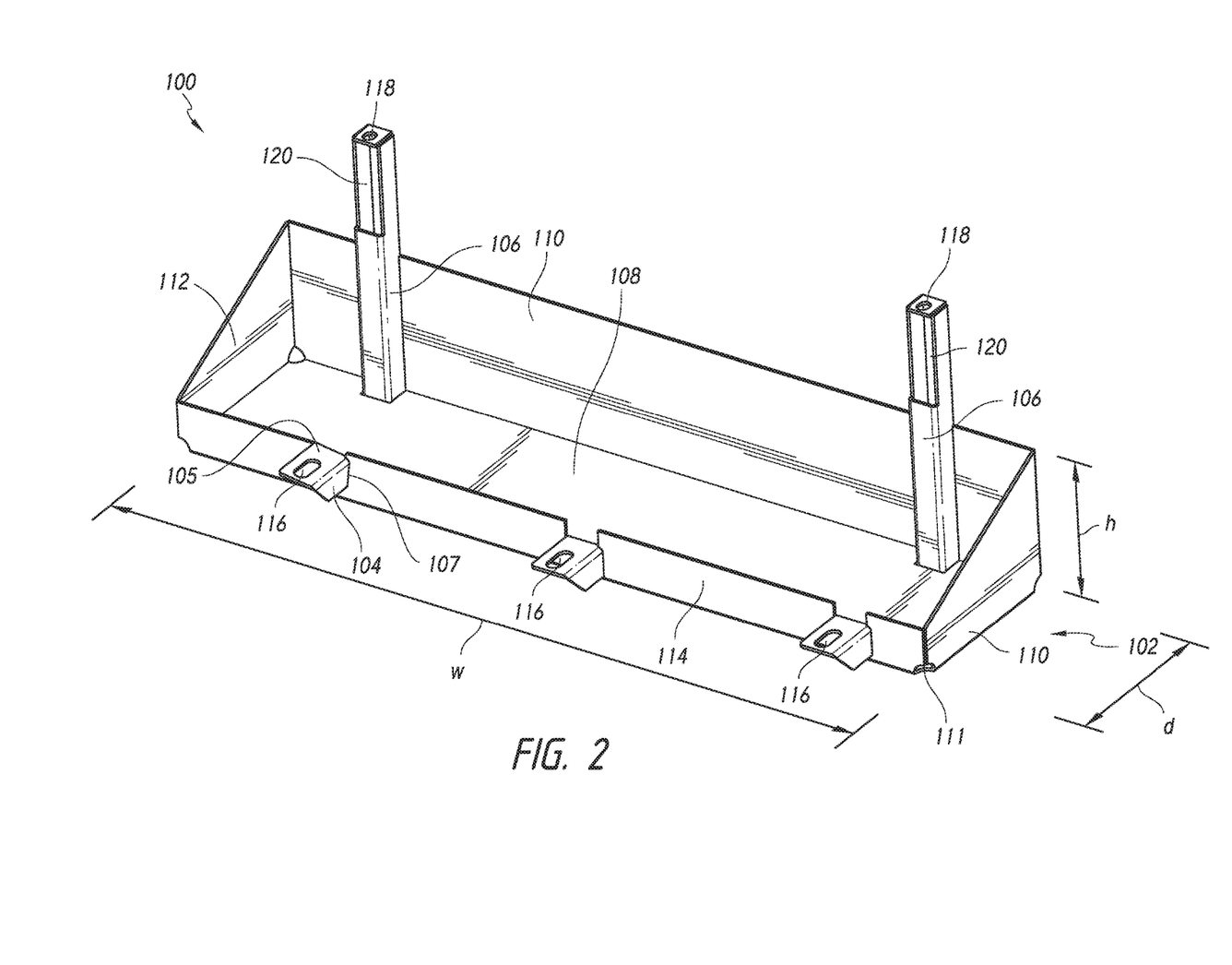
FIG. 2 illustrates a front angled view of an embodiment of a DEF tank cover.

FIG. 2 illustrates an embodiment of a DEF tank cover 100 which can be attached to a vehicle in order to cover/protect a DEF tank. As shown, the DEF tank cover 100 can generally include a housing 102, a plurality of horizontally extending attachment tabs 104, and a plurality of vertically extending vertical brackets 106. As shown in FIG. 2, the DEF tank cover 100 can include three attachment tabs 104 and two outer vertical brackets 104, though the particular number of these components does not limit the disclosure and three or more attachment tabs 104 can be used and two or more outer vertical brackets 104 can be used. In some embodiments, less than three attachment tabs 104 can be used or less than two outer vertical brackets 104 can be used. These components will be further discussed in detail below.

In some embodiments the DEF tank cover 100 can be formed of steel, for example ⅛ inch (11 gauge) steel, polymer, or ceramic, though the particular materials do not limit the disclosure. Further, the DEF tank cover 100 can be partially or fully coated (such on all exposed exterior surfaces) for improved resistance to road salt, abrasion, and other wear and tear, in particular around an outer portion of the housing 102. Accordingly, any number of coatings known in the art can be applied to the DEF tank cover 100 to improve certain properties of the cover 100. In some embodiments, different components of the DEF tank cover 100 can be made from different materials. In some embodiments, all components of the DEF tank cover 100 can be made of the same material.

The housing 102 can include a base 108 connected to an outboard wall 110, a pair of side walls 112, and an inboard wall 114 which all can extend transverse, such as vertically, up from the base 108 to form a general bucket-like shape. In some embodiments, the base 108 can have a generally rectangular footprint. The housing 102 can be configured to at least partially receive a DEF tank of a vehicle. The general shape of the housing 102 can be modified for particular DEF tanks for vehicles. In some embodiments, the housing 102 can be contoured to fit tightly against a DEF tank. In some embodiments, the housing 102 can at least partially cover five surfaces of a DEF tank. In some embodiments, the housing 102 can at least partially cover more than five surfaces of a DEF tank. In some embodiments, the housing 102 can at least partially cover less than five surfaces of a DEF tank.

In some embodiments, potentially due to manufacturing requirements, the corners connecting the base 108 to the other walls can be open, or have gaps 111. In some embodiments, there may be 1, 2, 3, or 4 corner gaps 111. These gaps 111 in some embodiments may allow fluid to leak out of the housing 102 to prevent fluid buildup. In some embodiments, these corners can be closed.

In some embodiments, the housing 102 can be made from a single sheet and the different walls can be folded vertically from the base to form the housing 102. In some embodiments, the different walls can be attached together to form the housing 102, such as by adhesion or welding, though the particular attachment does not limit the disclosure.

As shown in FIG. 2, the base 108 of the housing 102 can be generally rectangular in shape and generally flat. Thus, as shown, the width (w) of the base 108 can be greater than the depth (d). In some embodiments, the width can be 2, 3, 4, 5, 6, or 7 times greater than the depth. In some embodiments, the width can be greater than 2, 3, 4, 5, 6, or 7 times greater than the depth. In some embodiments, the width can be less than 2, 3, 4, 5, 6, or 7 times greater than the depth. However, the particular shape of the base 108 does not limit the disclosure, and can be any number of shapes. In some embodiments, the base 108 can be configured to conform with a DEF tank to provide a tighter fit on the vehicle.

Attached on opposite sides of the base 108 along the longer edges are the outboard wall 110 and the inboard wall 114. The outboard/inboard walls 110/114 can be generally parallel to one another, though other configurations can be used. In some embodiments, the outboard wall 110 can have a height (h) greater than the height of the inboard wall 114. In some embodiments, the outboard wall 110 can have a height 2, 3, 4, 5, 6, or 7 times greater than that of the inboard wall 114. In some embodiments, the outboard wall 110 can have a height greater than 2, 3, 4, 5, 6, or 7 times greater than that of the inboard wall 114. In some embodiments, the outboard wall 110 can have a height less than 2, 3, 4, 5, 6, or 7 times greater than that of the inboard wall 114. The differences in height can allow for embodiments of the DEF tank cover 100 to better fit within the contours of the underside of a vehicle. Further, as shown both the outboard/inboard walls 110/114 can be generally rectangular in shape, though the particular shape of the walls does not limit the disclosure.

The outboard/inboard walls 110/114 can be connected to one another by side walls 112 located on opposite sides of the base 108. As shown in FIG. 2, the side walls 112 can further be connected to the base 108. In some embodiments, the side walls 112 can have a generally triangular shape. As shown in FIG. 2, one corner of the triangular shape can be cut off by the inboard wall 114. Thus, the side walls 112 can extend from the top of the outboard wall 110 to the top of the inboard wall 114 to connect them.

In some embodiments, the outboard wall 110, outer wall 112, and side walls 112 can have the same thickness. In some embodiments, they can have different thickness. In some embodiments, some walls have the same thickness and some have different thicknesses.

Further, as shown the DEF tank cover 100 can include a pair of vertical brackets 106 extending inwards along the outer wall 110. However, the number of vertical brackets 106 does not limit the disclosure, and any number of vertical brackets can be used. As shown, the vertical brackets 106 can extend from the base 108 above the height of the outboard wall 110. In some embodiments, the vertical bracket 106 can extend about 1.1, 1.2, 1.3, 1.4, 1.5, 1.6, 1.7, 1.8, 1.9, or 2.0 times the height (h) of the outboard wall 110.

In some embodiments, the vertical bracket 106 can extend greater than about 1.1, 1.2, 1.3, 1.4, 1.5, 1.6, 1.7, 1.8, 1.9, or 2.0 times the height (h) of the outboard wall 110. In some embodiments, the vertical bracket 106 can extend less than about 1.1, 1.2, 1.3, 1.4, 1.5, 1.6, 1.7, 1.8, 1.9, or 2.0 times the height (h) of the outboard wall 110. In some embodiments, the vertical brackets 106 can be a generally rectangular prism in shape, though the particular shape of the bracket is not limiting and can be adjusted to fit a vehicle. In some embodiments, the vertical brackets 106 can be spaced equally away from the side walls 110/112. In some embodiments, the vertical brackets 106 may be spaced at different distances from the side walls 110/112. In some embodiments, the vertical brackets 106 may be located spaced apart from the side walls 110/112.

Figure 3:
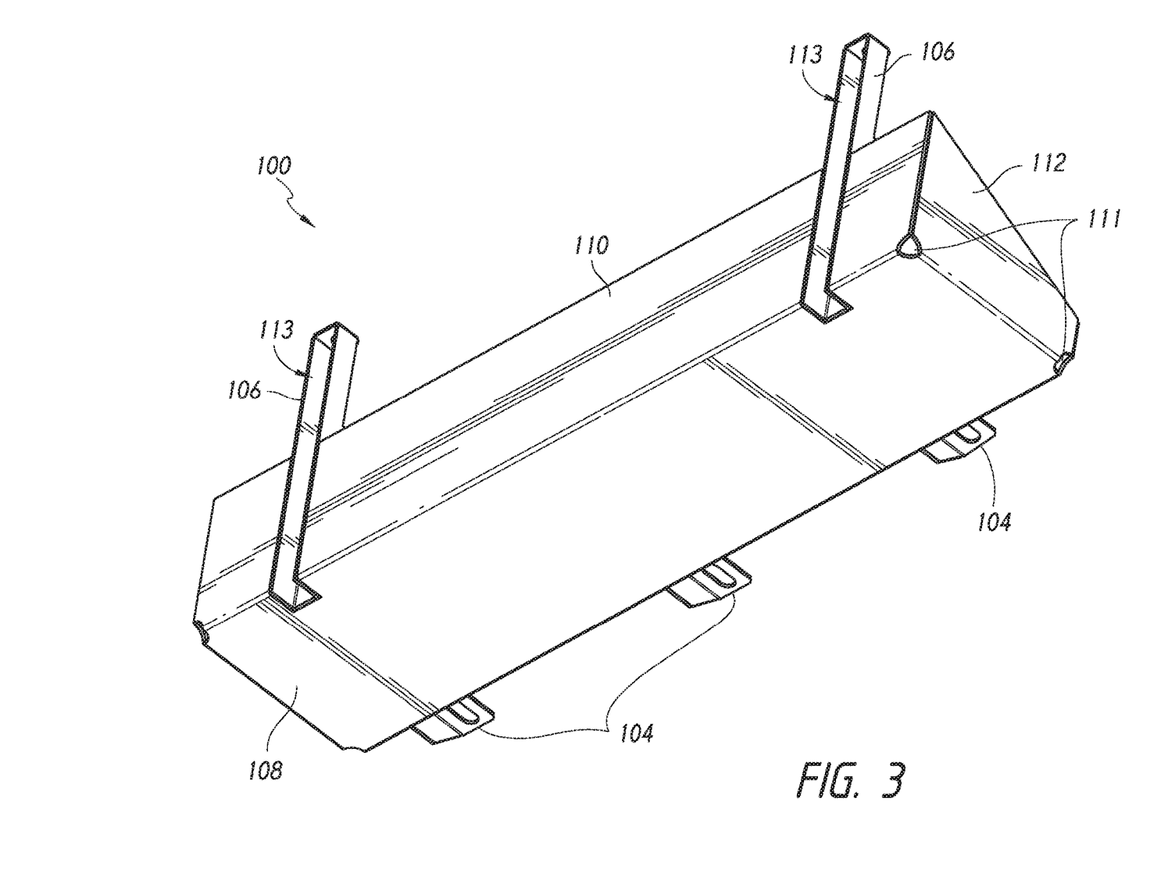
FIG. 3 illustrates a back angled view of an embodiment of a DEF tank cover.
Figure 5:
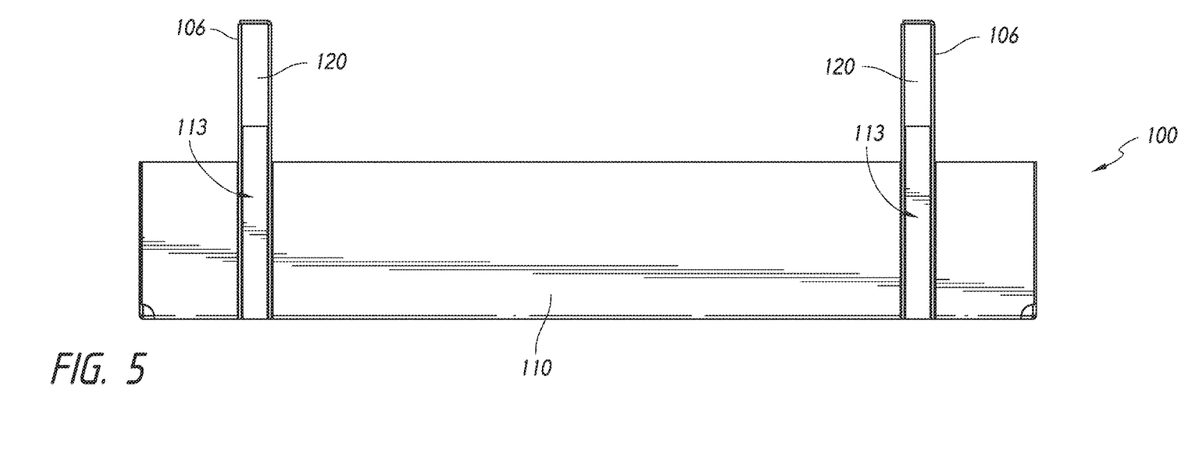
FIG. 5 illustrates a back view of an embodiment of a DEF tank cover.
Figure 6:
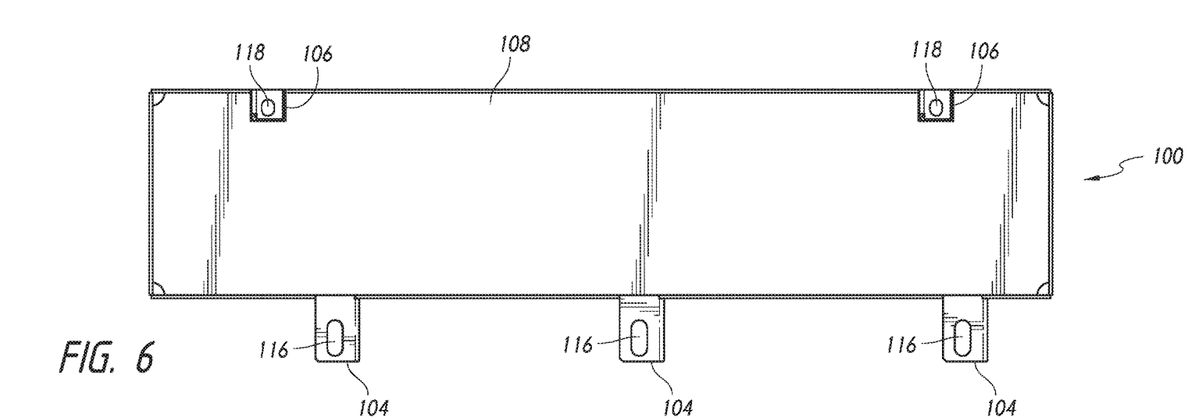
FIG. 6 illustrates a top view of an embodiment of a DEF tank cover.
Figure 7:
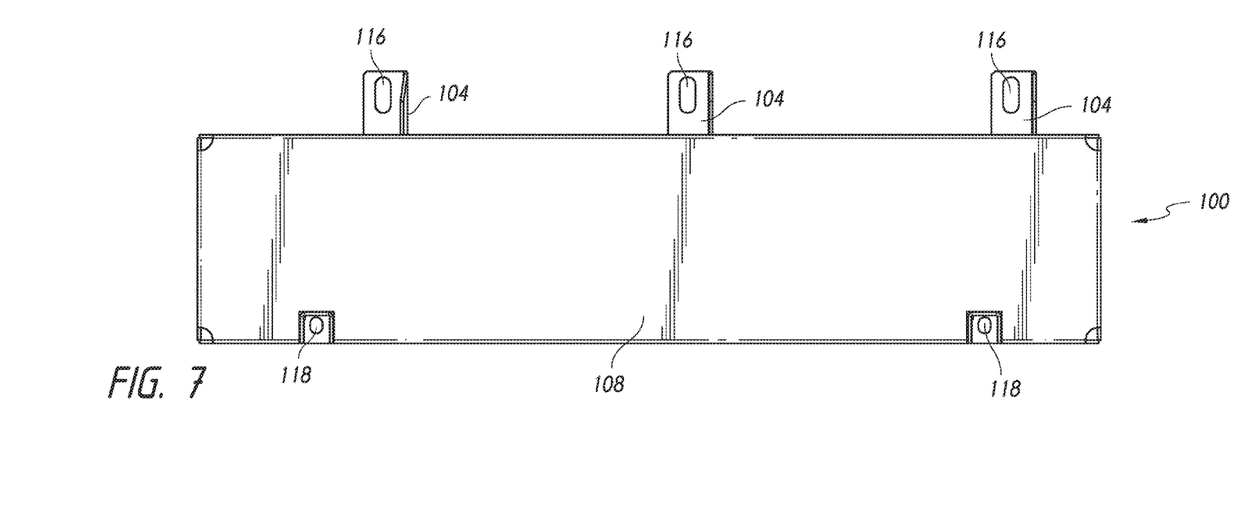
FIG. 7 illustrates a bottom view of an embodiment of a DEF tank cover.

As shown in FIG. 2, the vertical brackets 106 can be aligned with the outboard wall 110 so that they protrude into the housing 102, e.g., towards the center of the DEF tank cover 100. In some embodiments, the vertical brackets 106 can be contained fully within the housing of the base 108. As shown in FIGS. 3 and 5, the vertical brackets 106 can be integrally formed with the outboard wall 110. However, in some embodiments the vertical brackets 106 can be attached to the outer wall 100 through, for example, adhesives, welding, or other chemical/mechanical attachment means. Further, as shown in FIGS. 3 and 5, the vertical brackets 106 can include a cavity 113 along part of or the entirety of the vertical brackets 106 so that they are generally hollow. This cavity 106 can be open at the bottom and outer extending surface of the vertical brackets 106 (e.g., into the base 108 and outboard wall 110) so that there are only four closed sides of the rectangular prism shape, though in some embodiments one or both of the bottom or outer surfaces are closed. Further, the cavity 106 can extend towards the center of the DEF tank cover 100 through opening 120 on an inner surface of the vertical bracket 106, shown in FIG. 2. The opening 120 can be generally rectangular in shape, though the particular shape does not limit the disclosure. In some embodiments, the opening 120 can generally extend from above the outboard wall 110 to a top surface of the vertical bracket 106. In some embodiments, the vertical bracket 106 may not have opening 120. Additionally, an aperture 118 can be formed on the topmost surface of the vertical brackets 106. Thus, as shown in the top viewpoint of FIG. 6 and bottom viewpoint of FIG. 7, the aperture 118 and cavity 106 can extend fully from the top to the bottom of the vertical brackets 106.

Opposite the vertical brackets 106, inboard attachment tabs 104 can extend from the inboard wall 112 away from the DEF tank cover 100. In some embodiments, 2, 3, 4, 5, or 6 attachment tabs 104 can extend from the inboard wall 112. FIG. 2 shows a particular embodiment having three attachment tabs 104, though the number of tabs is not limiting. In some embodiments, the attachment tabs 104 can be equally spaced along the inboard wall 112. In some embodiments, the attachment tabs 104 may not be equally spaced along the inboard wall 112.

As shown in FIG. 2, the attachment tabs 104 can be composed of an attachment portion 105 and a hanging portion 107, each being a relatively thin sheet. The attachment portion 105 is attached to the inboard wall 112 whereas the hanging portion 107 is only attached to the attachment portion 105 and can be formed, for example, by bending the attachment tab 104. The hanging portion 107 can attach to the attachment portion 105 at approximately a 90° angle, though the particular angle does not limit the disclosure. The hanging portion 107 can extend from a side of the attachment portion 105 as shown in FIG. 2. The attachment portion 106 can be generally rectangular in shape and the hanging portion 107 can be generally shaped like a trapezoid, though the particular shapes are not limiting.

Figure 4:
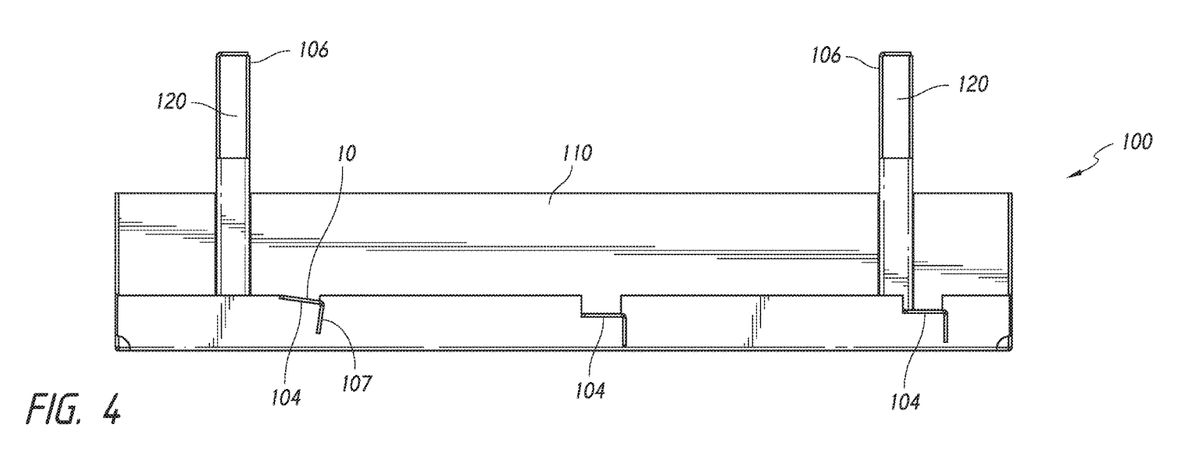
FIG. 4 illustrates a front view of an embodiment of a DEF tank cover.

In some embodiments, the attachment portion 105 can extend traverse, such as generally perpendicularly away from the inboard wall 114. In some embodiments, the attachment portion 105 can be generally parallel to the base 108. However, in some embodiments, the attachment portion 105 may be angled with respect to the base 108. For example, FIG. 4 illustrates a leftmost attachment tab 104 which is at an angle from the base 108 whereas the middle and rightmost attachment tabs 108 have a general parallel attachment surface 105. In some embodiments, some or all of the attachment portions 105 can be angled off parallel to the base 108. In some embodiments, some or all of the attachment portions 105 can be parallel to the base 108.

Figure 8:
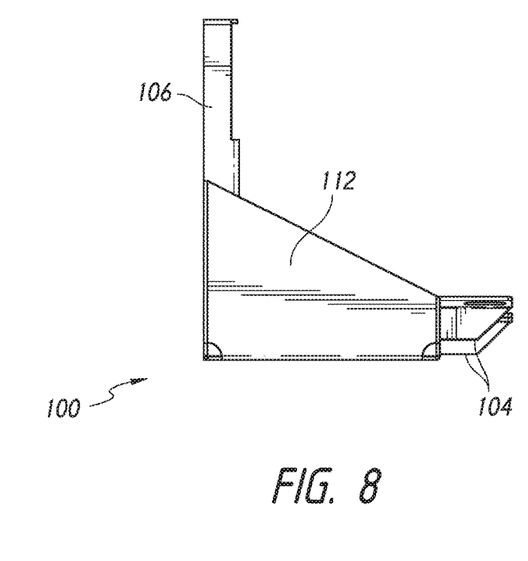
FIG. 8 illustrates a side view of an embodiment of a DEF tank cover.
Figure 9:
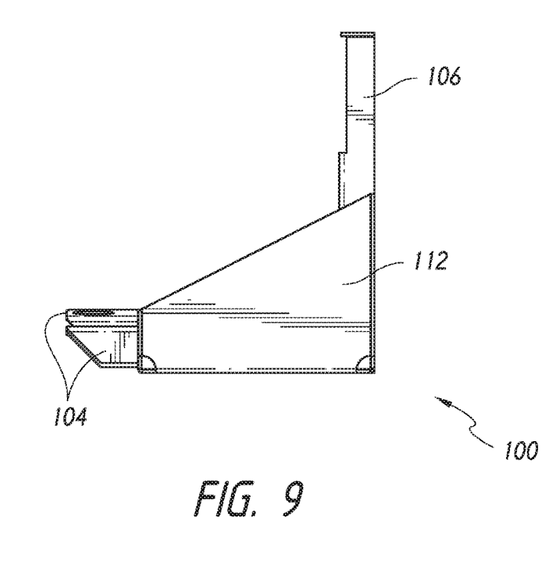
FIG. 9 illustrates a side view of an embodiment of a DEF tank cover.

Further, as shown in FIG. 3, the attachment tabs 104 can extend away from the outer wall 112 at different heights. For example, the middle attachment tab 104 may be closer to the base 108 than the other attachment tabs 104. In some embodiments, the positioning can leave a gap in the inboard wall 114 above the attachment tab 104. This can be additionally seen in the side views of FIGS. 8-9. In some embodiments, all of the attachment tabs 104 are at the same height. In some embodiments, all of the attachment tabs 104 are at different heights. In some embodiments, any angled attachment tabs 104 all have a first height and any parallel attachment tabs 104 all have a second height.

The attachment portion 105 of the attachment tabs 104 can further include an aperture 116 extending through the attachment portion 105. The aperture 116 can be generally ovaloid in shape, though the particular shape does not limit the disclosure.

DEF Tank Cover Installed on Vehicle

FIGS. 10-14 illustrate an embodiment of the DEF tank cover 100 attached to a vehicle 900. As mentioned, the installation desirably can be performed without the need to add holes, apertures, or other modifications to any portion of the vehicle 900 as may be required for the cover 3000 of FIG. 1.

Figure 10:
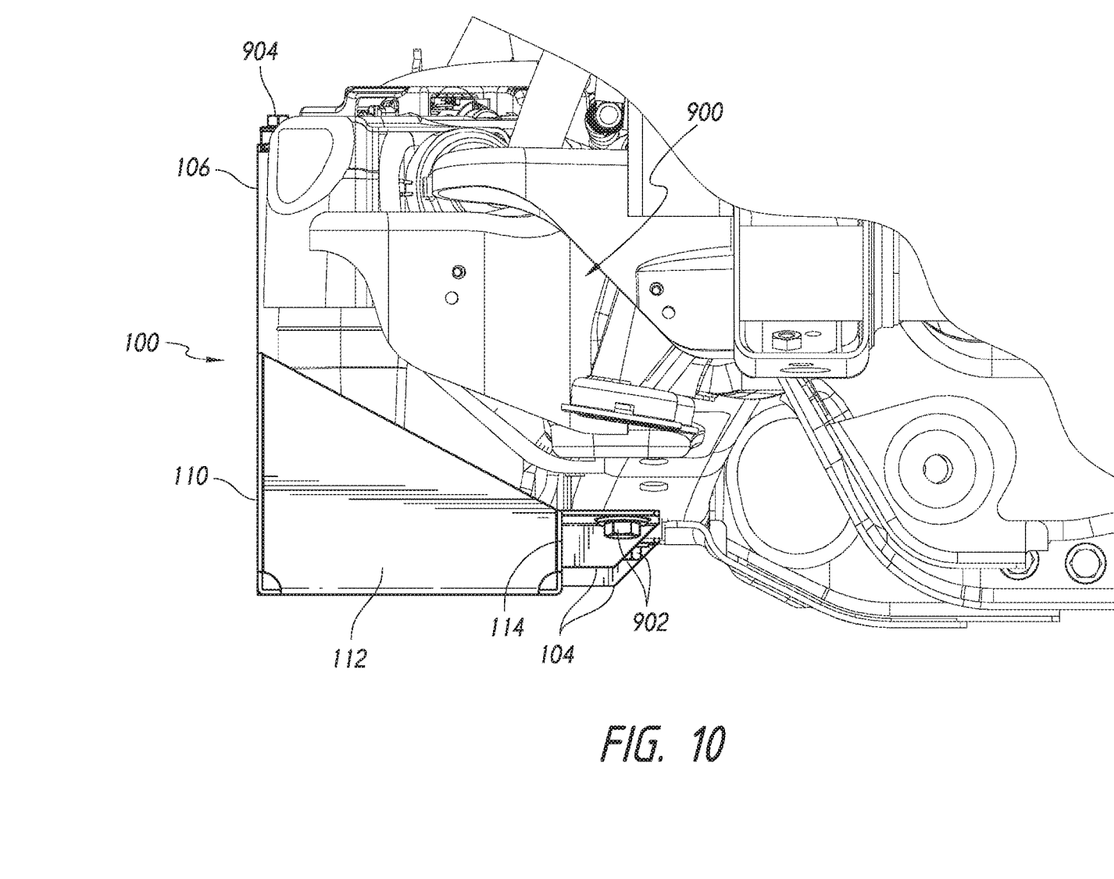
FIG. 10 illustrates a side view of an embodiment of a DEF tank cover attached to a vehicle.

FIG. 10 illustrates a side view of the DEF tank cover 100 installed onto a vehicle 900. As shown, the outboard wall 110 is generally on the outboard side of the vehicle 900, whereas the inboard wall 114 is located on the inboard side towards the center line of the vehicle 900.

Further, as shown in FIG. 10, the DEF tank cover 100 can be attached to the vehicle 900 through a series of inboard bolts 902 and outboard bolts 904. In some embodiments, inboard bolts 902 can be bolts that come factory installed with the vehicle 900. For example, the inboard bolts 902 could have attached a factory installed DEF tank cover that would be replaced by embodiments of the disclosed DEF tank cover 100. The inboard bolts 902 may be included on the vehicle 900 even if a factory DEF tank cover was not included. Thus, new/replacement inboard bolts 902 may not be needed for installation. Further, outboard bolts 904 can be configured to be sized to fit within previous holes made into the vehicle 900.

Figure 11:
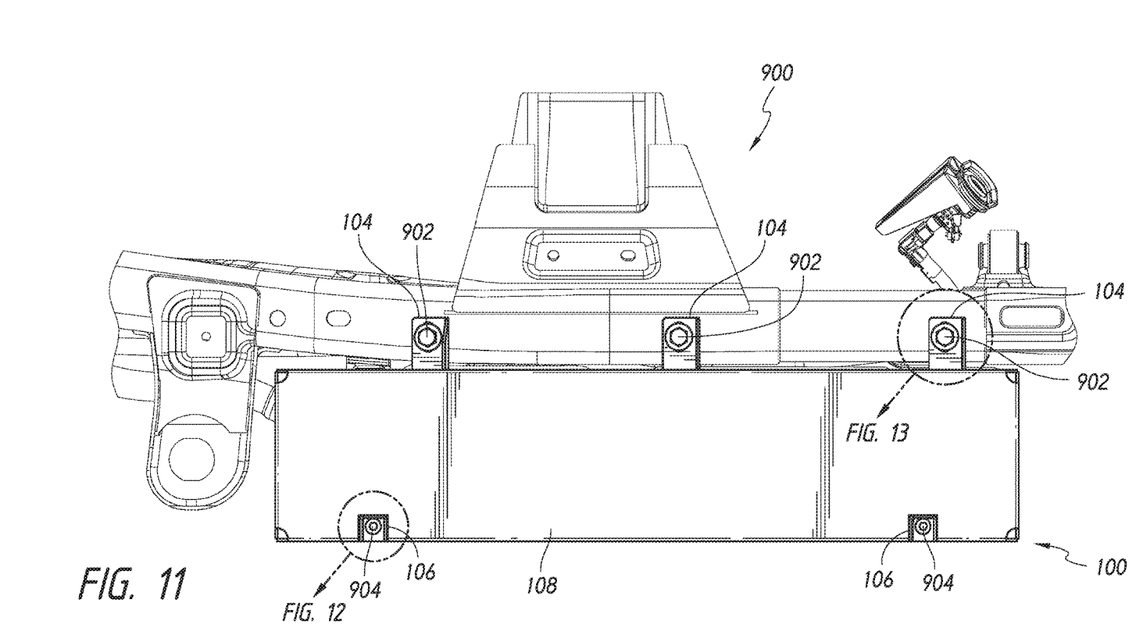
FIG. 11 illustrates a bottom view of an embodiment of a DEF tank cover attached to a vehicle.
Figure 12:
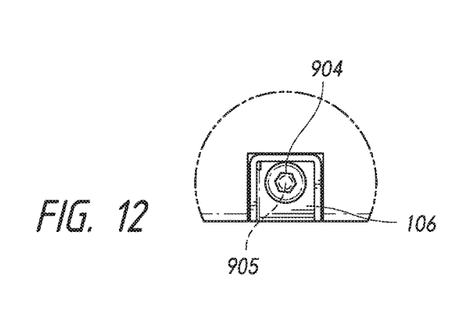
FIG. 12 illustrates a screw connecting an outer portion of an embodiment of a DEF tank cover to a vehicle.
Figure 13:
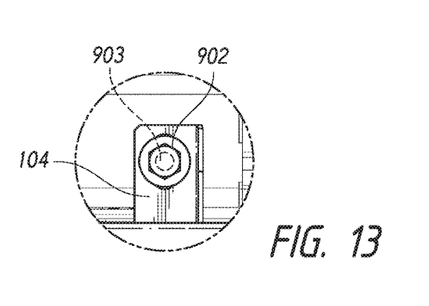
FIG. 13 illustrates a screw connecting an inner portion of an embodiment of a DEF tank cover to a vehicle.

FIG. 11 illustrates a bottom view of an embodiment of the DEF tank cover 100 installed onto the vehicle 900. As shown, all bolts 902/904 can be visible from the bottom of the DEF tank cover 900. FIGS. 12-13 illustrate magnified views of the bolts 902/904 in the attachment tab 104 and vertical bracket 106, respectively.

Figure 14:
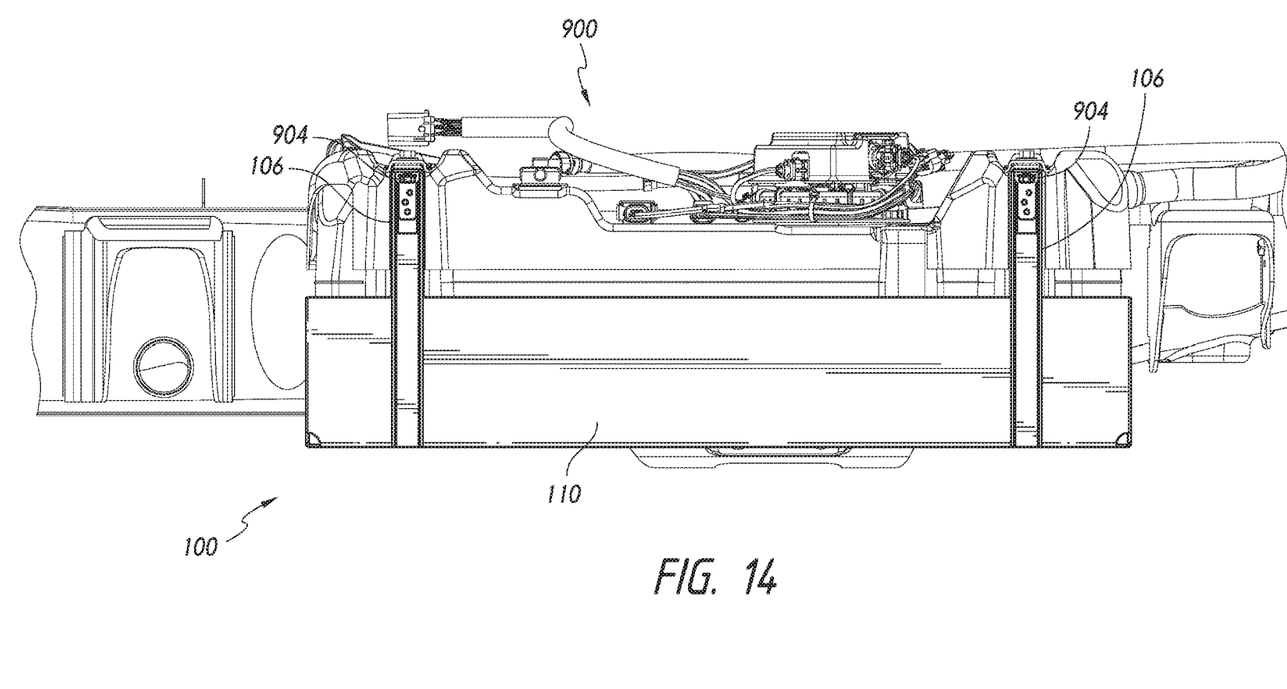
FIG. 14 illustrates a back view of an embodiment of a DEF tank cover attached to a vehicle.

FIG. 14 illustrates a side view of the DEF tank cover 100 installed onto the vehicle 900, illustrating the general look of the DEF tank cover 100 upon installation from an view looking inboard towards the vehicle 900.

Installation of DEF Tank Cover

As discussed above, embodiments of the DEF tank cover 100 can be installed on any number of vehicles such as, for example, a Chevy Silverado HD or a GMC Sierra HD, though the particular type of vehicle does not limit the disclosure. Further, minor modifications can be made to embodiments of the DEF tank cover 100 in order to fit with particular vehicle structures and are within the disclosure herein.

Advantageously, embodiments of the DEF tank cover 100 can be installed without the use of drills or the formation of additional holes (e.g., no-drill installation which can install on factory mounting locations) as may be required for the installation of the cover 3000 in FIG. 1. Further, embodiments of the DEF tank cover 100 can be installed using production TORX head drivers which meet production torque specifications.

Figure 15:
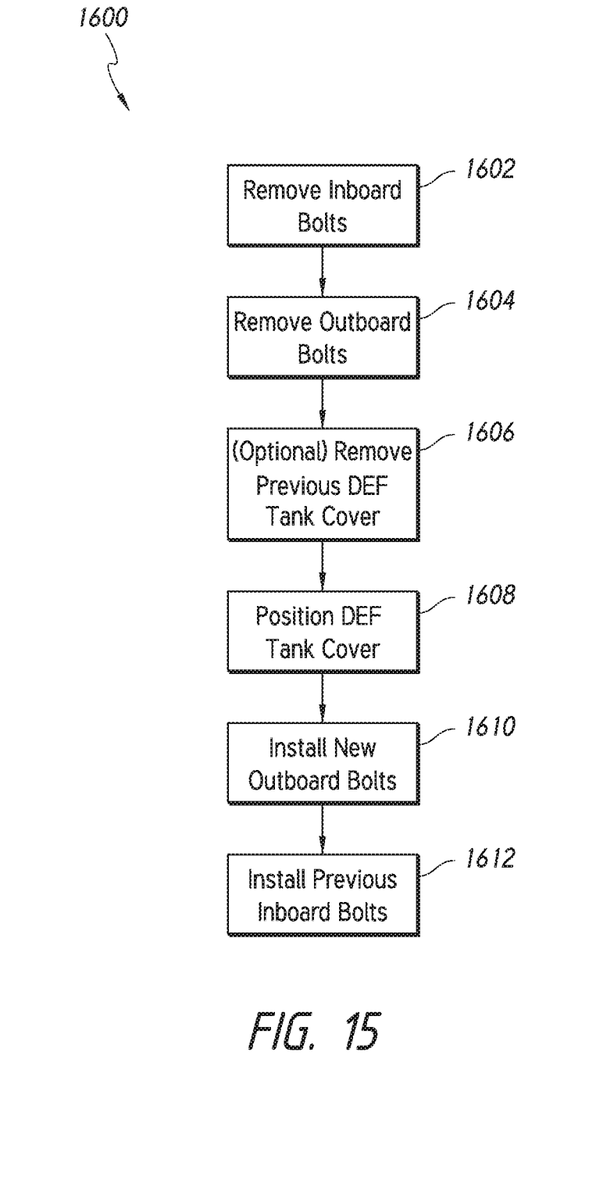
FIG. 15 illustrates an embodiment of a method for installing a DEF tank cover.

An embodiment of an installation method 1400 is shown in FIG. 15. In some embodiments, the vehicle can be lifted up to provide better access to the DEF tank, though this step may not be necessary for all vehicles. Next, if there is a factory installed DEF tank cover on the vehicle 900 (or another previously installed DEF tank cover), this can be removed 1602-1606. Typically, the factory installed DEF tank cover would be removed by removing 1602 the inboard bolts 902 from inboard mounting holes 903 and removing 1604 outboard bolts (to be replaced by outboard bolts 904) from outboard mounting holes 905 in the vehicle. The outboard mounting holes 905 can generally be located on factory brackets from previously installed DEF tank covers. The inboard mounting holes 903 can generally be located on a frame of the vehicle 900. The factory installed DEF tank cover can then be removed 1606. In some embodiments, a factory foam, e.g., a foam blanket that can help with temperature control can be located on the previous DEF tank. If this feature is on the vehicle, it can remain as embodiments of the DEF tank cover 200 can be configured to hold the foam in place. However, the foam can be removed if so desired.

In some embodiments, there may not be a previously installed DEF tank cover. However, the bolts described above will likely still be installed on the vehicle, and thus can be removed in a similar fashion.

Embodiments of the DEF tank cover 100 can be positioned into place so that the apertures 118 of the vertical brackets 106 are aligned with the outboard mounting holes 905 of the vehicle 1608, shown in FIG. 12. Bolts 904 can be installed 1610 through the apertures 118 and into the outboard mounting holes 905 to hold the DEF tank cover 100 partially onto the vehicle 900. Advantageously, the outboard bolts 904 can be the same drive as the removed factory bolts, but can have a longer length allowing for easier access during installation. Following, the inboard bolts 902 can be installed 1612 through aperture 116 of the attachment member 104 and into the inboard mounting holes 903 of the vehicle, shown in FIG. 13. Thus, the same bolts are being used for this procedure and new bolts do not need to be used. Finally, all bolts can be tightened onto the vehicle to install the DEF tank cover 100. The longer outboard bolts 904 can advantageously be installed first, and their increased length can allow for an installer to more easily install the inboard bolts 902 while the outboard bolts 904 can hold the weight of the DEF tank cover 100. However, in some embodiments the previous factory outboard bolts could be used as well.

Advantages Over Prior DEF Tank Covers

Embodiments of the disclosed DEF tank cover 100 can provide a number of different advantages to a user as compared to DEF tank covers known in the art, such as shown in FIG. 1.

First, the inboard bolts 902 will be the same as those already on the vehicle 900, and thus no new parts will be needed for this area. Accordingly a DEF tank cover kit need only include an embodiment of the DEF tank cover 100 along with two outboard bolts 904, though a different number of bolts may be used. The vertical brackets 106 can also provide for a significantly stable and consistent attachment to the frame.

In addition, outboard bolts 904 can be installed into the factory manufactured outboard mounting holes of the vehicle 900. By doing this, no additional holes/apertures need to be drilled, screwed, or otherwise installed into the vehicle 900, such as needed with FIG. 1, while still maintaining adequate attachment to the vehicle. This prevents unwanted damage to the vehicle 900, as well as prevents a user from improperly damaging the vehicle 900. In addition, by using bolts that are similar to those already installed, standard wrenches can be used to install the bolts onto the vehicle 900.

From the foregoing description, it will be appreciated that an inventive DEF tank covers and installation methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A cover for a diesel exhaust fluid (DEF) tank of a vehicle, the cover comprising:
   a housing configured to at least partially surround a DEF tank, the housing having a height, width, and length;
   a plurality of inboard attachment tabs, the plurality of inboard attachment tabs extending away from the housing and each having an inboard aperture configured to receive a bolt from a factory DEF tank cover;
   a pair of vertical brackets extending away from the housing, the pair of vertical brackets extending in a generally perpendicular direction to the plurality of inboard attachment tabs, wherein each of the pair of vertical brackets comprises an outboard aperture; and
   a pair of outboard bolts configured to pass through the outboard apertures and into threaded holes used by the factory DEF tank cover.

2. The cover of claim 1, wherein the cover comprises three inboard attachment tabs.

3. The cover of claim 1, wherein the cover can be installed on a vehicle without drilling.

4. The cover of claim 1, wherein the pair of vertical brackets comprise an aperture extending generally in the direction of the plurality of inboard attachment tabs.

5. The cover of claim 1, wherein the pair of vertical brackets extend away from the cover at a distance of greater than half the height of the housing.

6. A vehicle comprising the cover of claim 1.

7. A vehicle having a cover assembly for a diesel exhaust fluid (DEF) tank, the vehicle comprising:
   a DEF tank located generally under a frame of the vehicle and connected to the frame; and
   a DEF tank cover assembly comprising:
      a housing configured to at least partially surround a DEF tank, the housing having a height, width, and length;
      a plurality of inboard attachment tabs, the plurality of inboard attachment tabs extending away from the housing and each having an inboard aperture configured to receive a bolt from a factory DEF tank cover to attach the plurality of inboard attachment tabs to the frame;
      a pair of vertical brackets extending away from the housing, the pair of vertical brackets extending in a generally perpendicular direction to the plurality of inboard attachment tabs, wherein each of the pair of vertical brackets comprises an outboard aperture; and
      a pair of outboard bolts configured to pass through the outboard apertures and into threaded holes used by the factory DEF tank cover to attach the plurality of inboard attachment tabs to the frame.

8. The vehicle of claim 7, wherein the cover comprises three inboard attachment tabs.

9. The vehicle of claim 7, wherein the cover is configured to be installed on the vehicle without drilling.

10. The vehicle of claim 7, wherein the pair of vertical brackets comprise an aperture extending generally in the direction of the plurality of inboard attachment tabs.

11. The vehicle of claim 7, wherein the pair of vertical brackets extend away from the cover at a distance of greater than half the height of the housing.

* * * * *